(12) United States Patent
Key et al.

(10) Patent No.: US 12,393,435 B2
(45) Date of Patent: Aug. 19, 2025

(54) OPERATING SYSTEM INDEPENDENT CONTROL OF CONSTRAINED DEVICES

(71) Applicant: Losant IoT, Inc., Cincinnati, OH (US)

(72) Inventors: Charlie Key, Cincinnati, OH (US); Michael Kuehl, Cincinnati, OH (US); Brandon Cannaday, Cincinnati, OH (US); Anthony Canterbury, II, Cincinnati, OH (US); Adam Daniel, Maineville, OH (US); Dylan Schuster, Norwood, OH (US)

(*) Notice: Subject to any disclaimer, the term of this patent is extended or adjusted under 35 U.S.C. 154(b) by 0 days.

(21) Appl. No.: 17/714,526

(22) Filed: Apr. 6, 2022

(65) Prior Publication Data

US 2023/0325219 A1 Oct. 12, 2023

(51) Int. Cl.
*G06F 9/455* (2018.01)
*G06F 9/48* (2006.01)
*G06F 9/54* (2006.01)

(52) U.S. Cl.
CPC ........ *G06F 9/4552* (2013.01); *G06F 9/45508* (2013.01); *G06F 9/4881* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 10,929,122 B1* | 2/2021 | Goodwin | G06F 8/656 |
| 11,025,707 B1* | 6/2021 | Luker | H04L 41/5054 |
| 2013/0290963 A1* | 10/2013 | Simske | G06Q 50/18 |
| | | | 718/100 |
| 2018/0032329 A1* | 2/2018 | Fildebrandt | G06F 8/71 |
| 2021/0067607 A1* | 3/2021 | Gardner | H04L 41/082 |
| 2021/0216359 A1* | 7/2021 | Rana | G06N 20/00 |

* cited by examiner

*Primary Examiner* — Bradley A Teets
*Assistant Examiner* — Melissa A Headly

(57) ABSTRACT

A device may be controlled using a method which comprises generating a bundle and deploying that bundle to the device. In such a method, the bundle may comprise one or more sets of workflow instructions, as well as a set of agent instructions. The agent instructions may, when executed, control execution of workflows corresponding to the sets of workflow instructions based on inputs from an application which is also resident on the device.

18 Claims, 5 Drawing Sheets

OPERATING SYSTEM INDEPENDENT CONTROL OF CONSTRAINED DEVICES

FIELD

The present disclosure generally relates to the control of constrained devices. More particularly, and not by way of any limitation, the present disclosure is directed to a device which lacks an operating system and uses combined interactions of a runtime environment provided by an application stored in firmware, and workflows and an agent stored in the device's memory to control the device's behavior.

BACKGROUND

Due to factors such as the wide availability of inexpensive sensors and processors, embedded devices that connect with and exchange data with other devices are broadly used in industrial and other contexts. However, despite their ubiquity, embedded devices often have significant constraints. For example, an embedded sensor device may not have sufficient resources to provide common software infrastructure, such as an operating system. This, in turn, can make it difficult to define, deploy and update the logic which would control the behavior of such a device. Accordingly, there is a need in the art for technology which can be used in defining and updating behavior in resource-constrained environments such as embedded devices.

SUMMARY

Disclosed herein is technology which can be implemented in a variety of manners, including a method comprising generating and deploying a bundle. In such a method, the bundle may comprise one or more sets of workflow instructions, each of which may be operable to, when executed, perform a corresponding workflow. The bundle may also comprise a set of agent instructions operable to, when executed, perform acts comprising receiving inputs from an application resident on the device, and, based on those inputs, controlling execution of the one or more sets of workflow instructions. In a method of generating and deploying such a bundle, deploying the bundle may comprise sending the bundle to the device on which the application resides. Other ways of implementing the disclosed technology are also possible, and so the material set forth in this summary should be understood as being illustrative only, and should not be treated as limiting.

BRIEF DESCRIPTION OF THE DRAWINGS

The drawings and detailed description which follow are intended to be merely illustrative and are not intended to limit the scope of the technology protected by this document as set forth in the appended claims.

DETAILED DESCRIPTION

Disclosed herein is novel technology which can be used for a variety of purposes, including defining, deploying and updating the logic which would control the behavior of a sensor or other embedded device. This technology may be applicable in industrial settings, where improvements in how devices such as accelerometers, thermometers and other sensors are updated may be particularly useful. However, it should be understood that the disclosed technology may be applied in other settings as well, such as agriculture, construction, or other areas where device resource constraints may be a concern. Accordingly, the description and examples set forth herein should be understood as being illustrative only, and should not be treated as implying limitations on the protection provided by this document or any related document.

Figure 1:
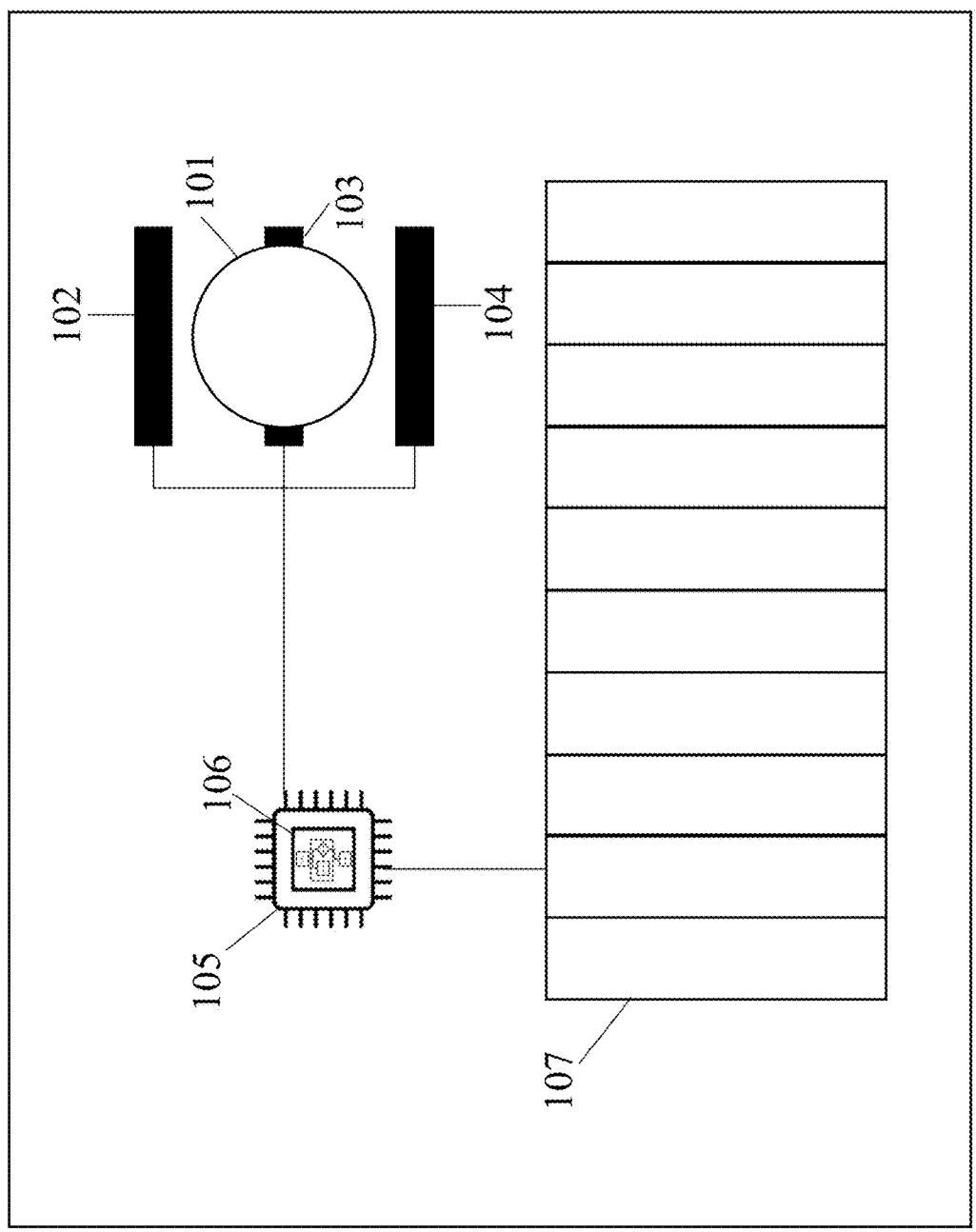
FIG. 1 depicts a high level overview of a device with which the disclosed technology may be applied.

Turning first to FIG. 1, that figures provides a high level overview of a device 100 with which the disclosed technology may be applied. In FIG. 1, the device 100 would function as an accelerometer, and comprises a mass 101, as well as a plurality of sensing elements (e.g., piezoelectric crystals) 102-104 which would generate voltages when the device 100 is accelerated. The device 100 of FIG. 1 also includes firmware 105, which would store an application 106 which may directly interface with the hardware elements of the device 100. For example, an application 106 may include a function called read_accelerometer which would convert voltages generated by interaction between the mass 101 and the sensing elements 102-104 into acceleration values measured in meters per second per second. Similarly, in a device which was configured with components for sensing temperature rather than acceleration, an application may provide a read_temperature function which could operate similarly to the read_accelerometer function described above. Other types of functions which may be utilized by an application 106 to interface with a device's hardware (e.g., a read or write message function which may interface with a network connection) are also possible and will be immediately apparent to those of ordinary skill in the art in light of this disclosure. Accordingly, the functions described above should be understood as being illustrative only, and should not be treated as limiting.

In some cases, an application 106 such as may be resident on a device's firmware 105 may also (or alternatively) provide functionality beyond direct hardware interactions as described above. For example, in some cases, an application 106 may provide a virtual stack machine or other type of runtime environment which can execute commands stored in dynamic memory 107 (i.e., memory which, in contrast to firmware, allows data to be dynamically written or modified during execution of instructions stored in the memory), and may also serve as an interface between code executed by the runtime environment and the device's underlying hardware. This may enable the behavior of a device to be controlled by logical sequences of operations (referred to herein as workflows) that could be deployed and updated without requiring changes to the device's firmware. A method which could be used to create, enable and deploy such workflows is illustrated in FIG. 2, discussed below.

Figure 2:
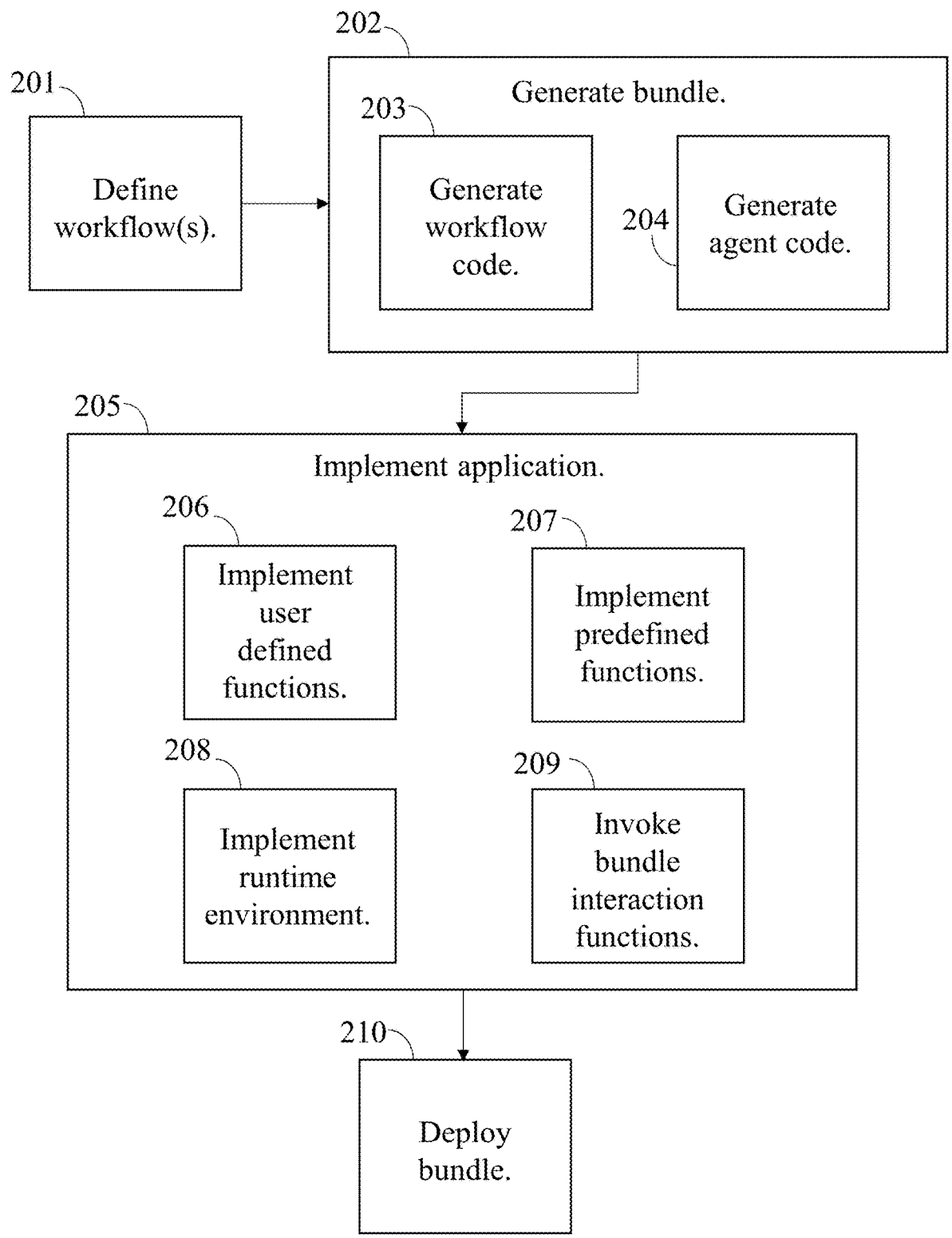
FIG. 2 depicts a method which may be used for creating, enabling and deploying workflows.
Figure 3:
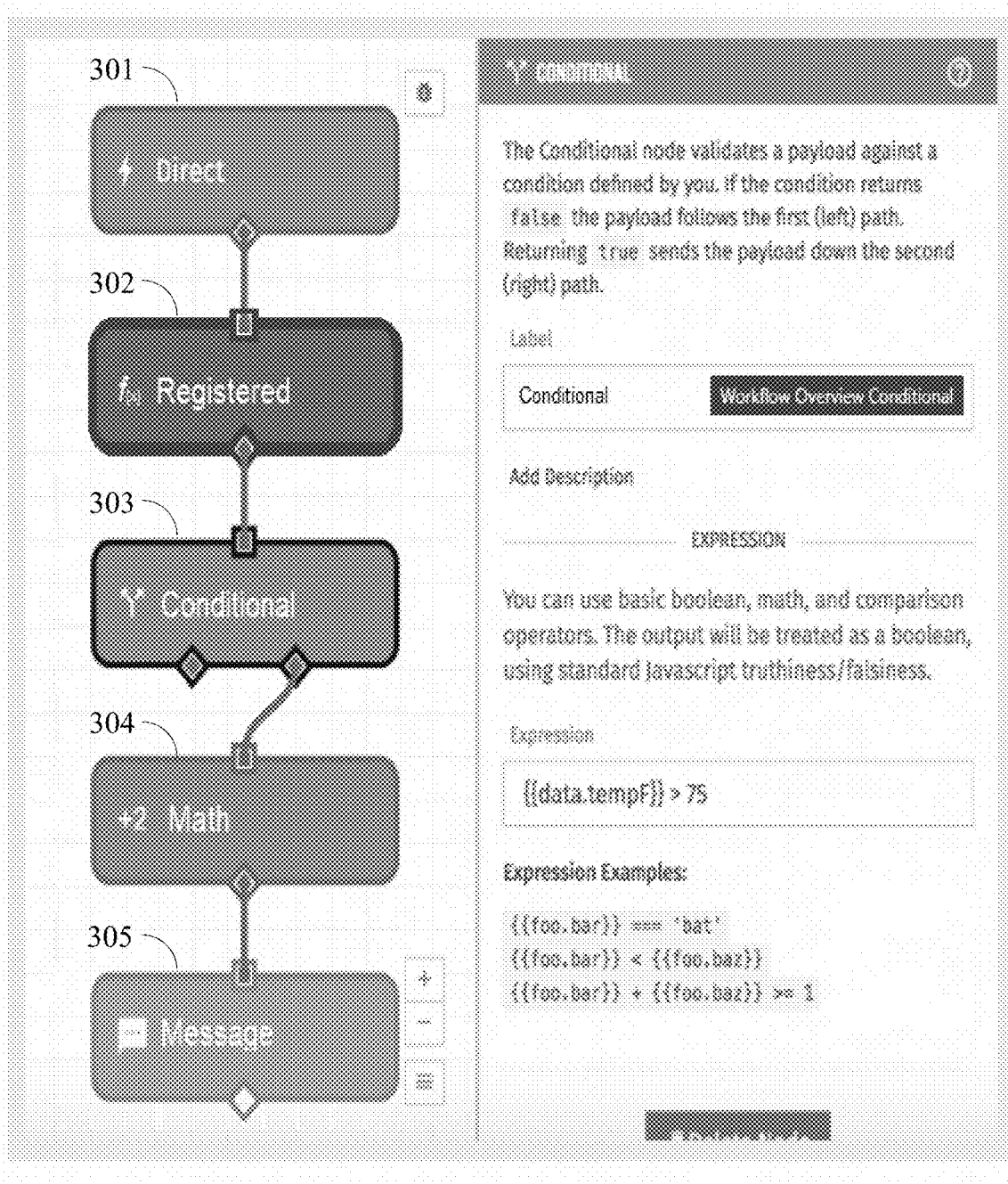
FIG. 3 depicts an interface which may be presented by a visual development environment.

Turning now to FIG. 2, as shown in that method, creating, enabling and deploying workflows may begin with defining 201 the workflows themselves. To illustrate how the workflows may be defined 201, consider FIG. 3, which illustrates an interface which may be presented by a visual development environment to a user who was defining a workflow for a device such as that shown in FIG. 1. As shown in FIG. 3, a visual development environment may allow a user to define a workflow as a series of nodes. A first of these nodes may be a trigger node 301, which defines the event that would cause the workflow to begin execution. In the workflow shown in FIG. 3, this event would be a direct call. That is, once the workflow has been deployed to, and loaded into a runtime environment of an application on, a device as shown in FIG. 1, the application could trigger that workflow's execution by sending a message specifically invoking that workflow. However, other types of events may also be used to trigger execution of a workflow. For example, in some cases a development environment may allow a user to use a timer node to indicate that a workflow should be executed periodically (e.g., whenever a timer expires, such as every five seconds), or after a certain time has elapsed since startup. Other types of triggers are also possible, and will be immediately apparent to those of ordinary skill in the art. Accordingly, the discussion of exemplary triggers which may be supported in some implementations of the disclosed technology should be understood as being illustrative only, and should not be treated as limiting.

Continuing with the discussion of FIG. 3, in the illustrated workflow, the trigger node 301 is followed by a registered node 302. This registered node 302 could be used to invoke functions defined by the user and implemented on the device where the workflow would be deployed. For example, in a case where a workflow was being created to check if a device was overheating, a user may configure the registered function node 302 with the name of a read temperature function such as described previously in the context of FIG. 1, the inputs that would be provided to that function (e.g., if the workflow was being deployed to a device with multiple temperature sensors, these might be identifiers of the sensor(s) to check), and the outputs that the function would provide (e.g., the location where the read temperature function would place its output, and the format used for encoding it). In this way, a workflow may be designed to invoke device specific functionality without having to account for the fact that that functionality could differ from device to device (e.g., generating a temperature reading from a thermocouple may be different from generating a temperature reading from a resistance temperature detector) or rely on infrastructure which may not be practical for use on an embedded device with limited resources (e.g., an operating system).

Also shown in FIG. 3 are two nodes which may be used to process information that may be retrieved using a registered node 302—i.e., a conditional node 303 and a math node 304. The conditional node 303 may be used to control branching logic. For instance, to continue the example where a workflow was being created to check if a device was overheating, a conditional node 303 could be used to check if a temperature retrieved through invocation of a read temperature function by the registered node 302 was over a threshold. If the temperature was below the threshold, then no action may be taken. Alternatively, if the temperature was above a threshold, then the workflow may continue with a math node 304, which the user could configure with one or more operations to manipulate the data prior to its application (e.g., by converting a temperature reading from Fahrenheit to Celsius).

In addition to nodes for initiating the workflow, and retrieving and processing data, a workflow such as could be created using an interface as shown in FIG. 3 may include other types of nodes. An example of this is the message node 305 shown in FIG. 3, which could be used to provide the results of the previous processing as output (e.g., as an alert that would be sent when a device was overheating). However, other types of nodes beyond those illustrated in FIG. 3 may also be provided in some cases. For example, a visual development environment implemented based on this disclosure may allow a user to include debug nodes, which would represent actions that would only be performed when a user had indicated that the workflow was being executed in debug mode. As another example, in some cases nodes may be provided that would allow the user to specify values that could be persisted for use by subsequent workflows. Similarly, in some cases there may be predefined operations which could correspond to tasks that would be likely to be useful in contexts where a workflow would be deployed. For example, in some cases a visual development environment may provide a node for fast Fourier transforms, which would automatically translate an array of points from a domain such as space or time into a frequency representation. As another example, a visual development environment may provide a node which would automatically calculate the root mean square value of an array of numbers.

Further variations on how a workflow may be defined 201 are also possible, will be immediately apparent to, and could be implemented without undue experimentation by, those of ordinary skill in the art in light of this disclosure. For example, in some cases, additional types of nodes beyond those illustrated or describe above, such as nodes for generating random numbers, nodes for manipulating string values, or nodes for triggering workflows in response to errors may be supported by a visual development environment such as could present an interface as shown in FIG. 3. Similarly, in some cases workflows may be defined 201 without using a visual development environment, such as using a command line or other text-based development environment, and/or may not utilize node based organization, instead defining the workflow using programming tools such as function and commands. Accordingly, the depiction and description of a node based visual development environment provided above in the context of FIG. 3 should be understood as being illustrative only, and should not be treated as limiting.

Continuing with the discussion of FIG. 3, after the workflow(s) had been defined 201, they could be used to generate 202 a bundle for the device. As shown in FIG. 3, this may include generating 203 workflow code, in which the logic of the previously defined 201 workflow could be translated into instructions which would be executed by the runtime environment provided by the application, and generating 204 agent code which would manage the execution of the various workflows. Each of these types of code generation is illustrated below in the context of generating 202 a bundle which would include code for the workflow shown in the interface of FIG. 3.

Starting with the generation 203 of workflow code, this may be illustrated by considering how the registered 302, conditional 303, math 304 and message 305 nodes for the workflow shown in FIG. 3 could be translated into the WebAssembly instruction format described in the specifications available at https://webassembly.org/specs/ and the pages linked to from that page, each of which is incorporated by reference in its entirety. For the registered node 302, this translation may include generating WebAssembly corresponding to the registered node using an import with the name of the function specified by the user as a descriptor for binding to the function as it would be implemented by the application. For the conditional 303 and math 304 nodes, these nodes may be considered as exemplary of nodes representing operations that would be performed by the workflow without requiring interaction with the external environment. A development environment may be configured to generate WebAssembly for this type of node using predefined logic corresponding to the relevant node type (e.g., logic converting a branch specified in a conditional node 303 to a representation in WebAssembly using if . . . else instructions). Finally, the activity represented by the message node 305 (or other node involving interaction with the external environment that would not be mediated by a registered function) may be translated into WebAssembly using predefined functions which would have known behavior but whose implementation would be included in the application. For example, a development environment may be configured to translate a message node 305 into WebAssembly by using a WebAssembly import to bind to a function named send_message that would be understood to provide functionality of sending a message to an endpoint outside of the runtime environment used to execute the workflow, and using data specified when configuring the message node as defining the parameters for the send_message function. Other types of nodes may be converted in a similar manner, using predefined internal logic, names of user defined (i.e., registered) functions, and names of predefined functions which would be implemented in the application as appropriate to generate WebAssembly corresponding to the various operations specified when defining 201 the workflow.

Figure 4:
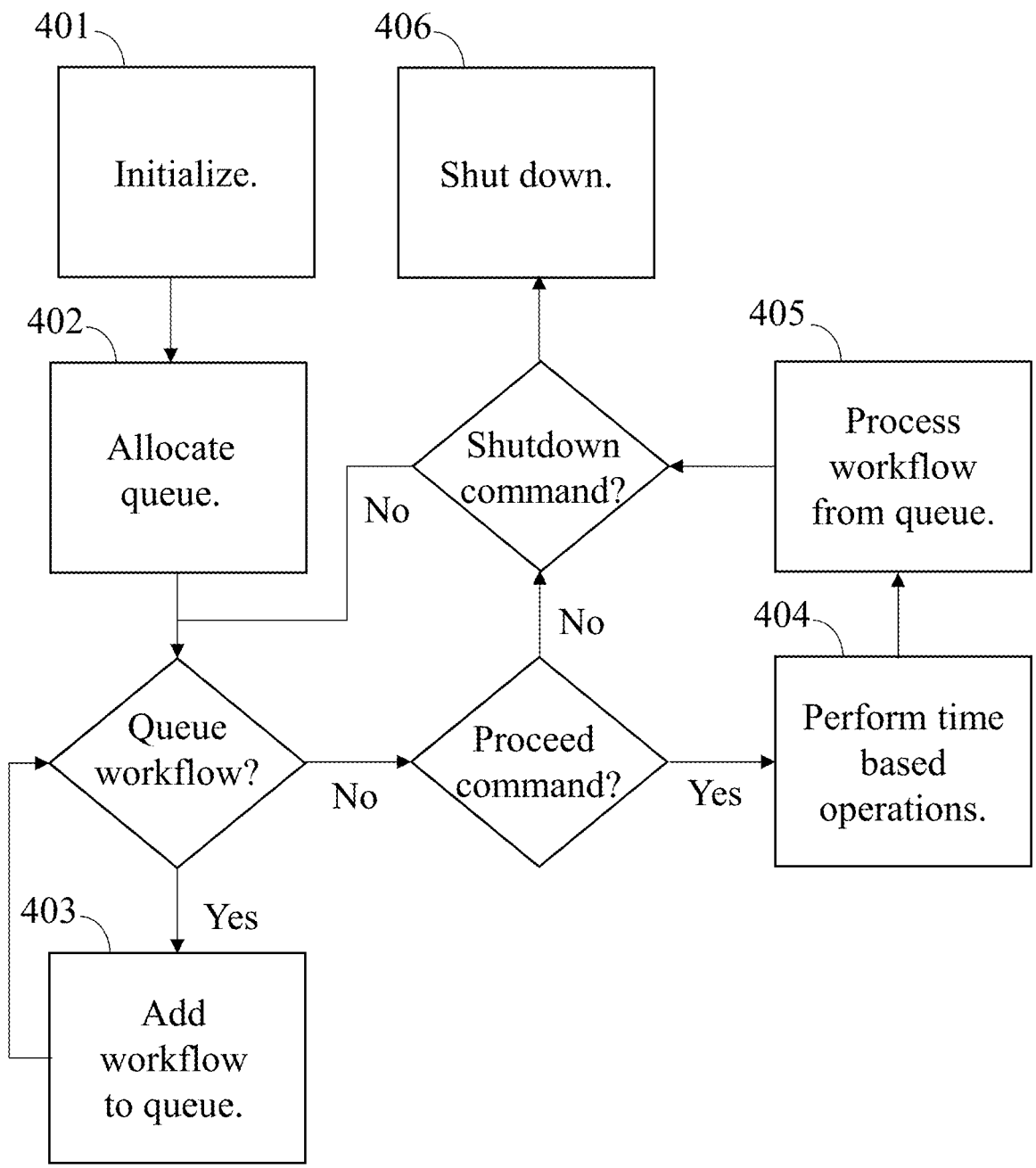
FIG. 4 depicts acts that an agent implemented based on this disclosure may perform.

Turning next to generation 204 of agent code, to illustrate what this type of code generation may entail, consider FIG. 4, which depicts acts that an agent such as could be defined by code included in a bundle may perform. As shown in FIG. 4, initially an agent may perform an initialization routine 401 to prepare for workflow execution. This may include acts such as reading values which had been stored during a previous execution of the device's workflow(s), obtaining an identifier for the device on which it was running, and setting up a buffer within memory accessible from the runtime environment where information from the application may be stored for subsequent processing by a workflow. Once initialization 401 was complete, the agent may allocate 402 a queue for pending workflows, and may add 403 a workflow to the queue when it receives a command to do so from the application (e.g., an invocation of a direct trigger such as could correspond to a direct trigger node 301). Subsequently, if the agent received a command to proceed with execution, it could perform 404 any time based operations (e.g., adding workflows that would be triggered by timer expiration to the queue if their timers had expired, storing data that a workflow had indicated should be available to other workflows in a memory location outside of the runtime environment if persisting and periodically updating data was enabled, etc.), and then process 405 (e.g., by popping and initiating execution of) a workflow from the queue. Later, if the agent received a command indicating that it should shut down, it could perform 406 a shutdown process, which may include activities such as persisting any values that a previously executed workflow indicated should be available for other workflows, and/or the workflow queue, in memory outside of the runtime environment. In this way, if workflow operation was restarted, it could be resumed in a manner which would reduce the potential dislocation caused by the terminating event.

Returning to the discussion of generating 204 agent code, in a system implemented using an agent which would engage in queue based management of workflows using a process such as shown in FIG. 4, generating 204 the agent code could comprise inserting code which would perform the process of FIG. 4 into the bundle along with the workflow(s). For instance, to continue the previous example in which the workflow(s) were translated into WebAssembly during the generation 203 of workflow code, the generation 204 of agent code could include incorporating WebAssembly code for performing a method such as shown in FIG. 4 into a WebAssembly module with the workflow code. This module could then be distributed to the device during subsequent bundle deployment 210.

As shown in FIG. 2, creating, enabling and deploying workflows may include implementing 205 the application which would provide the runtime environment where those workflows would be executed. As with generating 202 the bundle, implementing 205 the application may include a variety of subtasks. For example, as noted previously, an application may include user defined functions, such as read_accelerometer and read_temperature. Accordingly, the implementation of an application may include the user defining and implementing 206 such functions, for example, by writing code that would convert voltage measurements such as may be provided by piezoelectric components (in the case of an accelerometer such as shown in FIG. 1) or the leads of a thermocouple (in the case of a thermocouple based temperature sensor) into acceleration or temperature measurements, as appropriate. Similarly, implementing 205 an application may include implementing 207 previously defined functions that workflows may use to interact with the external environment. As described previously in the context of FIG. 3, these predefined functions may include a send_message function such as a workflow may use to provide data to an external endpoint. However, other predefined functions are also possible, and may be utilized in some implementations. For example, in some cases, implementing 207 predefined functions may include implementing the functions set forth below in table 1.

TABLE 1

Exemplary predefined functions which may be implemented 207 by an application and invoked by a workflow or agent.

| Predefined Function | Description |
| --- | --- |
| get_device_id | Causes the application to place a unique identifier (e.g., MAC address) for the device hosting the application into a designated (e.g., through providing a pointer as a parameter to get_device_id) location in memory accessible from the runtime environment. |
| send_message | Informs the application that a message with a specified length has been stored in specified memory location (e.g., at a location specified by a pointer passed as a parameter to send message) along with other information which the application may use in routing the data to the appropriate endpoint (e.g., a quality of service value, and/or a topic for the message or a pointer to a memory location from which the topic can be retrieved). |
| set_message_buffers | Used to inform (e.g., through passing a pointer as a parameter) the application of location(s) in memory that are accessible to the runtime environment and should be used as buffers for passing data to the agent or a workflow. |
| sleep | Used to cause the application to pause the execution of the workflow for a specified period (e.g., by sleeping a thread used to execute the workflow for a number of milliseconds passed as a parameter to sleep). |
| storage_read | Used to cause the application to read data which had previously been saved to memory locations outside of the runtime environment (e.g., during a shutdown 406 procedure in a process such as shown in FIG. 4) and to place that data into a specified (e.g., through passing a pointer as a parameter to storage_read) location which was accessible from the runtime environment so that the data could be read. |
| storage_save | Used to cause the application to store data in memory outside of the runtime environment. |

TABLE 1-continued

Exemplary predefined functions which may be implemented 207 by an application and invoked by a workflow or agent.

| Predefined Function | Description |
| --- | --- |
| trace | Used to cause the application to log tracing information, such as by writing messages to a console or standard output, which may be useful for early development or to debug unexpected behavior. |

After implementing the user-defined and predefined functions 206 207, implementing the application may continue with implementing 208 the runtime environment. As with the other activities illustrated in FIG. 2, implementing 208 the runtime environment may be performed in a variety of manners. For example, as noted previously, the runtime environment may take the form of a stack machine, and so implementing 208 the runtime environment may be performed by implementing a stack machine which would execute the various numeric, parametric and other instructions from the bundle. Alternatively, the runtime environment may be implemented by importing a preexisting runtime environment into the application itself. To continue the examples described above in which the bundle is encoded as a WebAssembly module, if the application was being implemented 205 using the Python 3 programming language, the runtime environment may be implemented 208 by installing the WASMER runtime environment provided by Wasmer, Inc. and available at https://wasmer.io/ of on the device and then incorporating it into the application and importing functions implemented by the application itself using code such as set forth below in table 2.

TABLE 2

Exemplary code for implementing 208 a runtime environment using a preexisting runtime.

```
from wasmer import engine, Store, ImportObject, Function, Module,
Instance, Memory, Memory Type
from wasmer_compiler_cranelift import Compiler
# The store represents all global state that can be
# manipulated by WebAssembly programs. The store
# holds the engine, which is responsible for compiling
# the module into something that can be executed.
store = Store(engine.JIT(Compiler))
# Define the memory to be imported into the module.
# minimum=1 starts the memory at one page (64Kb).
# A maximum may optionally be provided to limit memory use.
# shared=False does not allow the memory to be accessed between threads.
memory_type = Memory Type(minimum=1, shared=False)
# Define the memory instance, which consists of a vector of bytes.
memory = Memory(store, memory_type)
# Compile the module to be able to execute it.
module = Module(store, open("./bundle.wasm", "rb").read( ))

# Helper function to decode a string from the WASM memory buffer
# from the starting pointer and length.

def decode _string(memory, ptr_start, length):
    buffer = memoryview(memory.buffer)
    return str(buffer[ptr_start:(ptr_start + length)], "utf-8")

# Called by the bundle to log tracing information. This is useful
# during development to help debug what the bundle is doing.

def trace(message_ptr:int, message_length:int, level:int) -> int:
    print("trace")
    print(str(level) + ": " + decode _string(memory, message_ptr,
message_length))
    return 0
# Import memory and functions.
import_object = ImportObject( )
import_object.register(
    "env",
    {
    "memory": memory,
    "trace": Function(store, trace),
    }
)
# Create the executable instance of the WebAssembly module.
instance = Instance(module, import_object)
# Initialize the bundle.
return_code = instance.exports. init( )
print("init return code: " + str(return_code))
while(True):
    # Every second, invoke the loop exported function.
    # Pass the current time, in milliseconds since epoch.
    instance.exports. loop(int(time.time( ) * 1000))
    time.sleep(1)
```

Note
that "bundle.wasm" in the above exemplary code refers to previously generated 202 WebAssembly bundle that would be executed in the runtime environment.

As shown in FIG. 2, implementing 205 an application could also include incorporating appropriate code to invoke 209 functions used to interact with the agent and execute workflows. For example, after initially importing a bundle into a runtime environment, an application may execute an init( ) function to launch an initialization process 401 as described previously in the context of FIG. 4. Similarly, an application could execute a direct trigger function to indicate that a workflow should be added 403 to a queue, include a loop command in its (i.e., the application's) main control loop to indicate that execution should proceed, or call a shutdown function to indicate that execution should be shut down 406. However, other types of functions, such as configuration functions, and/or functions to indicate the accessibility of external endpoints may also be exposed by a bundle and invoked 209 by an application. For example, in some cases a bundle may expose and implement functions as described below in table 3, and an application on a device may invoke those functions as appropriate to control the device's operation.

TABLE 3

Exemplary functions which may be invoked by an application to use functionality implemented by a workflow or agent.

| Function | Description and Implementation |
| --- | --- |
| config_set_debug_enabled | Controls whether debug messages will be enabled. This may be implemented by storing a Boolean value in a location accessible from the runtime environment and, whenever a debug node was encountered in a workflow, only executing that node if the stored Boolean value was set to true. |
| config_set_message_buffer_lengths | Sets the length (e.g., number of bytes) for message buffers used in sending data from the application to a workflow or to the agent itself. This may be implemented by calling set_message_buffers using data provided by the set_message_buffer_lengths function as parameters. |
| config_set_queue_size | Sets a total amount of memory (e.g., as a size in bytes) for a queue used to store workflows. This may be implemented by storing the specific amount of memory in a memory location within the runtime environment and, before the agent adds a workflow to the queue, checking if the addition would cause the queue to exceed the limit. If it would, then, instead of enqueuing the workflow, an error message may be passed to the application. |
| config_set_storage_interval | Sets an interval (e.g., number of milliseconds) at which workflow data will be saved. This may be implemented by storing the specified interval in a memory location in the runtime environment and, each time the agent receives a proceed command, calling storage_save if more than the specified amount of time has passed since the last time storage save was called. |
| config_set_storage_size | Set a maximum size (e.g., a number of bytes) of storage that a workflow is allowed to consume. This may be implemented by storing the storage limit in a memory location which is accessible in the runtime environment and, when a workflow encounters a command which would persist storage values (e.g., a command for a node that would save values for use by other workflows) checking the memory which would be consumed against that storage limit before storing the relevant value(s). |
| config_set_trace_level | Set a level to be used in trace logs. For example, this function may take a 3 value parameter in which a first value disables trace logs, a second value logs errors only, and a third value provides verbose output. This may be implemented by storing the parameter in a memory location accessible in the runtime environment and using that parameter to determine what string is provided when invoking a trace function such as described in table 1. |
| direct_trigger | Invoke a workflow, which may be identified by a parameter in cases where multiple workflows are (or potentially may be) present. This may be implemented by an agent enqueuing a workflow (potentially with the relevant identifier) as described in the context of FIG. 4. |
| init | Initialize an instance of the agent for subsequent launching of workflows. This may be implemented as described in the context of FIG. 4, and may include operations such as providing pre-allocated memory buffers (e.g., using a set_message_buffers function), providing the device on which the agent and its workflows are deployed (e.g., using a get_device_id function), and obtaining persisted workflow storage values (e.g., using a storage read function). |
| loop | Execute the next queued workflow (if any). As described in the context of FIG. 4, this may be repeatedly called by the application as part of a main control loop, and may be implemented by performing time based operations and processing previously enqueued workflows. |
| message_received | Forwards a message received from an external source (e.g., a management platform) to the agent, potentially along with additional information (such as a topic) for assisting the agent in processing the message. This may be implemented by treating the message as a trigger for invoking a workflow, and the additional information as identifying the workflow which would be invoked. |
| set_connection_status | Sets the status of a connection between the device and an external endpoint (e.g., a management platform). This may be implemented by storing the message status in a location which is accessible from the runtime environment, and using that status for performing branching logic previously configured in a workflow based on whether information could or could not be communicated (e.g., not sending periodic alerts if the target for the alerts was unavailable). |

TABLE 3-continued

Exemplary functions which may be invoked by an application to use
functionality implemented by a workflow or agent.

| Function | Description and Implementation |
|---|---|
| shutdown | Used in preparation for shutdown. As described in the context of FIG. 4, this may be implemented by the agent performing acts such as saving values that should be persisted (e.g., using a storage _save function). |

Finally, the method of FIG. 2 completes with deployment 210 of the bundle. This may be performed in a variety of ways, depending on the context in which the deployment is to take place. For example, in an implementation where a bundle is generated 202 as a WebAssembly module, the bundle may be deployed 210 by copying it to a location in the device's memory prior to application startup so that the application could integrate the bundle into its runtime environment (e.g., using code such as shown in table 2) when it launched. Similarly, to support a scenario in which a bundle is to be deployed 210 after an application has launched (e.g., to provide newer version of a previously generated workflow), the application could be implemented 205 with a function which would destroy a previously created runtime environment (e.g., through sending a shutdown command to the agent and then deallocating the runtime environment after the shutdown command completed) and then create a new runtime environment with the newly deployed bundle.

Figure 5:
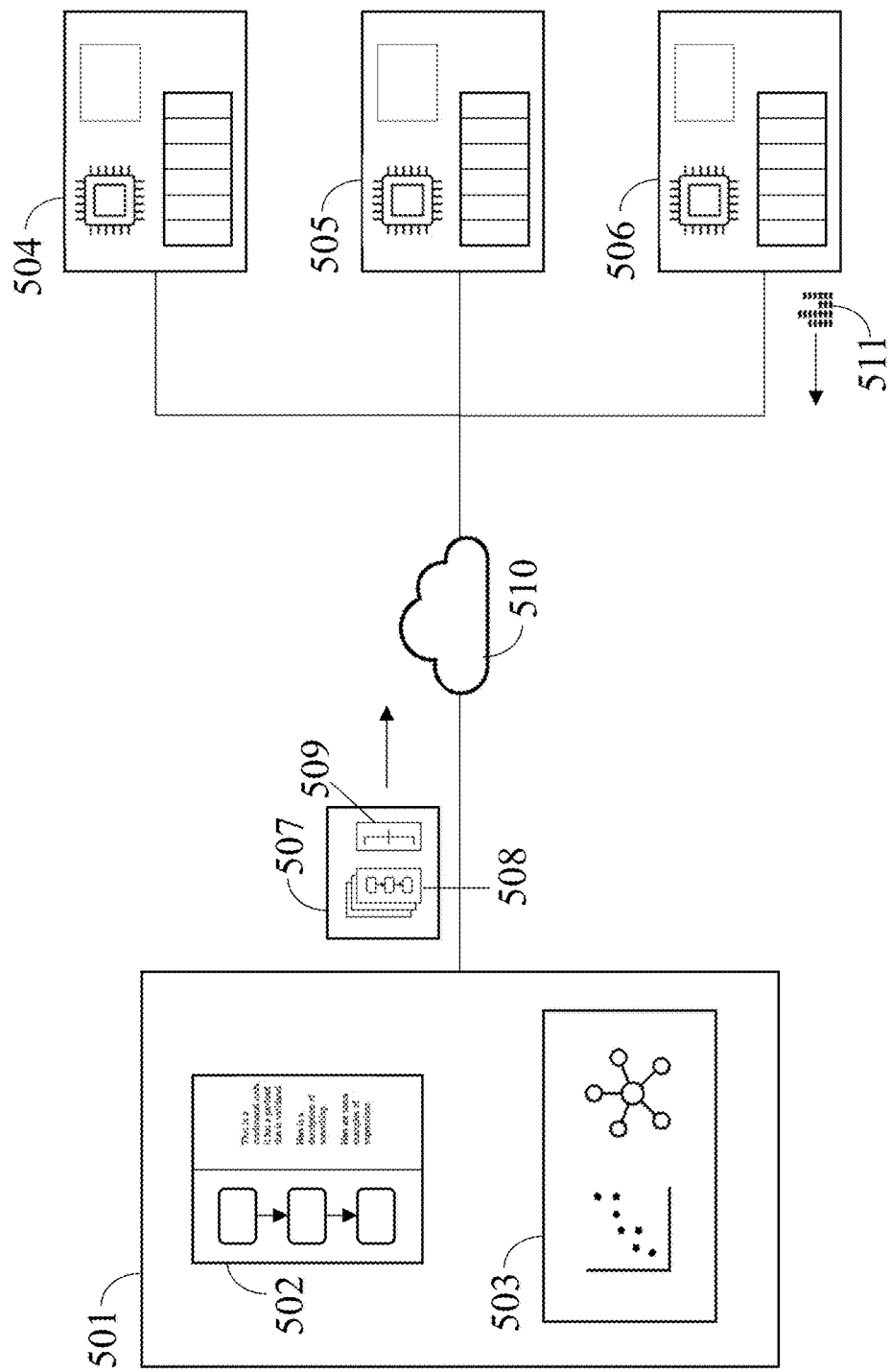
FIG. 5 depicts a high level architecture in which bundles may be deployed using a publish-subscribe communication protocol.

Other approaches to deploying bundles, including approaches which do not require a user to manually copy a bundle into device's memory, are also possible, and may be used in some cases. To illustrate, consider FIG. 5, which provides a high-level overview of an architecture in which bundles may be deployed 210 using a publish-subscribe communication protocol such as MQTT. In the architecture of FIG. 5, a platform 501 is depicted which would provide both a visual development environment 502 (e.g., as could expose an interface for creating workflows such as described previously in the context of FIG. 3), and a management interface 503 which could allow a user to access data regarding a set of one or more devices 504 505 506. In an implementation following the architecture of FIG. 5, once a user has defined a workflow, the development environment 502 may use that workflow to create a bundle 507 which could be executed by runtime environments provided by the devices 504 505 506. This may be done, for example by identifying the devices to which the workflow should be deployed, gathering all of the workflows which should be deployed to those devices, generating code for each of those workflows 508 in the format used by those devices' runtime environments, and adding code for the agent 509 (e.g., code the development environment may have been configured with in advance to be automatically added when a bundle is generated).

After the bundle 507 had been created it could be pushed to the appropriate devices 504 505 506 over a network 510, along with information (e.g., an MQTT topic) indicating that it contained code that those devices should execute. The devices 504 505 506 could then utilize code incorporated into their firmware (e.g., an MQTT client which could be incorporated into an application as described previously and programmed to recognize messages with specific topics as bundles to be executed) to execute the bundles in their local runtime environments. The devices may also use this code (e.g., integrated MQTT clients) to communicate data 511 back to the platform 501 along with information (e.g., MQTT topics) indicating how that data should be handled. For example, data that should be used to present graphical analytics may be communicated with a topic of "analytics," while data that should be sent as an alert to an SMS endpoint (e.g., data indicating that a device was overheating) may be sent with a topic of "alert." Of course, other topics, and other types of data communication are also possible, and will be immediately apparent to, and could be implemented without undue experimentation by, those of ordinary skill based on this disclosure.

Variations are also possible beyond those in topics and communication approaches described above. For example, consider generation of a bundle. In some cases, a development environment may convert a workflow directly into a format for the runtime environment(s) where it would be executed (e.g., into WebAssembly, in the examples provided previously). However, in other cases a development environment may first convert a workflow into an intermediate language such as Rust, and then compile that intermediate language into the bundle that ultimately is executed by the runtime environment(s) on the various devices. In this way, it may be possible to take advantage of optimizations built into Rust→WebAssembly compilers, thereby potentially providing a more space and/or memory efficient representation of the workflow for execution by the application. Other approaches (e.g., using different intermediate languages, such as C or C++, omitting an intermediate language, using a custom instruction set specifically designed for execution by applications such as described, using a command line or other text based development environment rather than a visual development environment, etc.) are also possible and will be immediately apparent to one of ordinary skill in light of this disclosure.

To further illustrate potential approaches which may be taken in implementing the disclosed technology, the following examples are provided to illustrate various non-exhaustive ways in which the teachings herein may be combined or applied. It should be understood that the following examples are not intended to restrict the coverage of any claims that may be presented at any time in this document or any related document. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this document or any related document include additional features beyond those referred to below, those additional features shall not be presumed to have been added for any reason relating to patentability.

Example 1

A method comprising: a) generating a bundle comprising: i) one or more sets of workflow instructions, wherein each set of workflow instructions is operable to, when executed, perform a workflow corresponding to that set of workflow instructions; and ii) a set of agent instructions operable to, when executed, perform a set of agent acts comprising: A) receiving inputs from an application resident on a device; and B) based on the inputs from the application resident on the device, controlling execution of the one or more sets of workflow instructions; and b) deploying the bundle by performing acts comprising sending the bundle to the device.

Example 2

The method of example 1, wherein: a) the device comprises a memory; b) the application is configured to, when executed, perform acts comprising: i) setting up a runtime environment in the memory; and ii) executing the bundle in the runtime environment.

Example 3

The method of example 2, wherein: a) setting up the runtime environment in the memory comprises identifying a set of memory locations comprised by the memory as accessible from the runtime environment; b) the bundle is configured to: i) write data to memory locations other than the set of memory locations identified as accessible from the runtime environment using a first import function implemented by the application; and ii) read data from memory locations other than the set of memory locations identified as accessible from the runtime environment using a second import function implemented by the application.

Example 4

The method of example 3, wherein: a) the device comprises one or more sensors; and b) the bundle is configured to obtain data based on measurements from the one or more sensors utilizing one or more user defined functions implemented by the application.

Example 5

The method of example 4, wherein: a) the method comprises, for at least one of the sets of workflow instructions, using a development environment to define the workflow corresponding to that set of workflow instructions, wherein defining the workflow corresponding to that set of workflow instructions comprises incorporating at least one of the one or more user defined functions into the workflow corresponding to that set of workflow instructions; and b) the development environment is configured to automatically generate the bundle using a set of import functions, wherein the set of import functions comprises the first import function and the second import function.

Example 6

The method of example 5, wherein: a) the development environment is a visual development environment; and b) the device does not have an operating system.

Example 7

The method of example 5, wherein the development environment is configured to generate the bundle by performing acts comprising: a) creating one or more sets of intermediate workflow instructions in a first language; b) creating a set of intermediate agent instructions in the first language; c) generating the one or more sets of workflow instructions by transforming the one or more sets of intermediate workflow instructions into a second language; and d) generating the set of agent instructions by transforming the set of intermediate agent instructions into the second language.

Example 8

The method of example 3, wherein the method comprises: a) providing an updated bundle the device, wherein the updated bundle comprises an updated set of agent instructions; b) in response to the updated bundle being provided to the device: i) the set of agent instructions using the first import function to write one or more data values to memory locations outside of the runtime environment; ii) the application performing a set of update actions comprising: A) deallocating the runtime environment; B) setting up a new runtime environment in the memory; and C) executing the updated bundle in the new runtime environment; and iii) the updated set of agent instructions reading the one or more data values using the second import function.

Example 9

The method of example 8, wherein the application continuously executes while performing the set of update actions.

Example 10

The method of example 2, wherein executing the bundle in the runtime environment comprises initiating execution of the set of agent instructions by calling a function implemented by the set of agent instructions.

Example 11

The method of example 10, wherein: a) the set of agent instructions comprises implementations of: i) one or more trigger functions; and ii) a proceeding function; b) the application is configured to: i) repeatedly call the proceeding function after initiating execution of the set of agent instructions; and ii) make at least one call to the one or more trigger functions; c) controlling execution of the one or more sets of workflow instructions comprises: i) upon receiving a call to the one or more trigger functions: A) identifying a set of workflow instructions corresponding to the received call to the one or more trigger functions; B) adding the workflow corresponding to the identified set of workflow instructions to a queue; ii) upon receiving a call to the proceeding function: A) removing a workflow from the queue; and B) executing the set of workflow instructions corresponding to the removed workflow.

Example 12

A system comprising a device comprising: a) a memory, the memory storing a bundle comprising: i) one or more sets of workflow instructions, wherein each set of workflow instructions is operable to, when executed, perform a workflow corresponding to that set of workflow instructions; and ii) a set of agent instructions operable to, when executed, perform a set of agent acts comprising: A) receiving inputs from an application; and B) based on the inputs from the application, controlling execution of the one or more sets of workflow instructions; and b) a firmware, the firmware storing the application, wherein the application is operable to, when executed, perform acts comprising: i) setting up a runtime environment in the memory; and ii) executing the bundle in the runtime environment.

Example 13

The system of example 12, wherein: a) setting up the runtime environment in the memory comprises identifying a set of memory locations comprised by the memory as accessible from the runtime environment; b) the bundle is configured to: i) write data to memory locations other than the set of memory locations identified as accessible from the runtime environment using a first import function implemented by the application; and ii) read data from memory locations other than the set of memory locations identified as accessible from the runtime environment using a second import function implemented by the application.

Example 14

The system of example 13, wherein: a) the device comprises one or more sensors; and b) the bundle is configured to obtain data based on measurements from the one or more sensors utilizing one or more user-defined functions implemented by the application.

Example 15

The system of example 14, wherein the system comprises a server connected to the device via a network connection, wherein the server stores instructions for a development environment, the instructions comprising names of a set of import functions comprising the first import function and the second import function, wherein the development environment is configured to: a) present an interface operable by a user to: i) define a workflow under development as a sequence of nodes; ii) include a desired user defined function from the one or more user defined functions by performing acts comprising: A) adding a first node having a first node type to the sequence of nodes; B) specifying a name of the desired user defined function as data for the first node; iii) include desired functionality for interacting with one or more targets outside of the runtime environment by adding a second node having a second type to the sequence of nodes, wherein the second type corresponds to the desired functionality; b) automatically generate code for execution in the runtime environment based on the workflow under development by performing acts comprising: i) incorporating a call to the desired function into the automatically generated code based on the name of the desired function being specified by the user; and ii) incorporating a call to at least one of the set of import functions based on the second node having the second type being added to the sequence of nodes.

Example 16

The system of example 15, wherein the device does not have an operating system.

Example 17

The system of example 15, wherein the development environment is configured to generate code for execution in the runtime environment by performing acts comprising: a) creating a set of intermediate instructions in a first language based on: i) the workflow under development; and ii) a set of agent instructions incorporated into the development environment; and b) generating the code for execution in the runtime environment in a second language based on the set of intermediate instructions.

Example 18

The system of example 12, wherein executing the bundle in the runtime environment comprises initiating execution of the set of agent instructions by calling a function implemented by the set of agent instructions.

Example 19

The system of example 18, wherein: a) the set of agent instructions comprises implementations of: i) one or more trigger functions; and ii) a proceeding function; b) the application is configured to: i) repeatedly call the proceeding function after initiating execution of the set of agent instructions; and ii) make at least one call to the one or more trigger functions; c) controlling execution of the one or more sets of workflow instructions comprises: i) upon receiving a call to the one or more trigger functions: A) identifying a set of workflow instructions corresponding to the received call to the one or more trigger functions; B) adding the workflow corresponding to the identified set of workflow instructions to a queue; ii) upon receiving a call to the proceeding function: A) removing a workflow from the queue; and B) executing the set of workflow instructions corresponding to the removed workflow.

Example 20

A machine comprising: a) a sensor; and b) means for controlling a device lacking an operating system using an application stored in firmware and one or more workflows and an agent stored in dynamic memory.

In light of the potential for variations and modifications to the material described explicitly herein, the disclosure of this document should not be treated as implying limits on the protection provided by this document or any related document. Instead, the protection provided by a document which claims the benefit of or is otherwise related to this document should be understood as being defined by its claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

Explicit Definitions

When used in the claims, "based on" should be understood to mean that something is determined at least in part by the thing that it is indicated as being "based on." When a claim is written to require something to be completely determined by a thing, it will be described as being "based EXCLUSIVELY on" the thing.

When used in the claims, a "computer" should be understood to refer to a group of devices (e.g., a device comprising a processor and a memory) capable of storing and executing instructions for performing one or more logical and/or physical operations on data to produce a result. A "computer" may include, for example, a single-core or multi-core microcontroller or microcomputer, a desktop, laptop or tablet computer, a smartphone, a server, or groups of the foregoing devices (e.g., a cluster of servers which are used in combination to perform operations on data for purposes such as redundancy and availability). In the claims, the word "server" should be understood as being a synonym for "computer," and the use of different words should be understood as intended to improve the readability of the claims, and not to imply that a "sever" is not a computer. Similarly, the various adjectives preceding the words "server" and "computer" in the claims are intended to improve readability, and should not be treated as limitations.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Examples of computer readable mediums including the following, each of which is an example of a non-transitory computer readable medium: volatile memory within a computer (e.g., RAM), registers, non-volatile memory within a computer (e.g., a hard disk), distributable media (e.g., CD-ROMs, thumb drives), and distributed memory (e.g., RAID arrays).

When used in the claims, "first," "second" and other modifiers which precede nouns or noun phrases should be understood as being labels which are intended to improve the readability of the claims, and should not be treated as limitations. For example, references to a "first function" and a "second function" should not be understood as requiring that one of the recited functions precedes the other in time, priority, or any other manner.

When used in the claims, "means for controlling a device lacking an operating system using an application stored in firmware and one or more workflows and an agent stored in dynamic memory" should be understood as a means+function limitation as provided for in 35 U.S.C. § 112(f), in which the function is "controlling a device lacking an operating system using an application stored in firmware and one or more workflows and an agent stored in dynamic memory" and the corresponding structure is a processor configured with an application stored in firmware, and an agent and one or more workflows stored in dynamic memory which would interact as described in the context of tables 1-3 and FIG. 4.

When used in the claims, a "set" should be understood to refer to a group of one or more things of similar nature, design or function. The words "superset" and "subset" should be understood as being synonyms of "set," and the use of different words should be understood as intended to improve the readability of the claims, and not imply differences in meaning.

What is claimed is:

1. A method comprising:
a) generating a bundle comprising:
   i) one or more sets of workflow instructions, wherein each set of workflow instructions is operable to, when executed, perform a workflow corresponding to that set of workflow instructions; and
   ii) a set of agent instructions comprising executable code operable to, when executed, establish an agent comprising implementations of one or more trigger functions and a proceeding function on a device, the agent configured to perform a set of agent acts comprising:
      A) receiving inputs from an application resident on the device; and
      B based on the inputs from the application resident on the device, controlling execution of the one or more sets of workflow instructions, wherein controlling execution of the one or more sets of workflow instructions comprises:
         i) upon receiving a call to the one or more trigger functions:
            A) identifying a set of workflow instructions corresponding to the received call to the one or more trigger functions;
            B) adding the workflow corresponding to the identified set of workflow instructions to a queue; and
         ii) upon receiving a call to the proceeding function:
            A) removing a workflow from the queue; and
            B) executing the set of workflow instructions corresponding to the removed workflow;
b) deploying the bundle by performing acts comprising sending the bundle to the device; and
c) executing, by the application, the bundle on the device, wherein the application, when executed performs the steps of,
   i) repeatedly calling the proceeding function after initiating execution of the set of agent instructions; and
   ii) making at least one call to the one or more trigger functions.

2. The method of claim 1, wherein:
a) the device comprises a memory, wherein the memory is dynamic memory;
b) the application is configured to, when executed, perform acts comprising:
   i) setting up a runtime environment in the memory; and
   ii) performing the act of executing the bundle on the device by executing the bundle in the runtime environment.

3. The method of claim 2, wherein:
a) setting up the runtime environment in the memory comprises identifying a set of memory locations comprised by the memory as accessible from the runtime environment;
b) the bundle is configured to:
   i) write data to memory locations other than the set of memory locations identified as accessible from the runtime environment using a first import function implemented by the application wherein memory locations other than the set of memory locations identified as accessible from the runtime environment are outside of the runtime environment; and
   ii) read data from memory locations other than the set of memory locations identified as accessible from the runtime environment using a second import function implemented by the application wherein memory locations other than the set of memory locations identified as accessible from the runtime environment are outside of the runtime environment.

4. The method of claim 3, wherein:
a) the device comprises one or more sensors; and
b) the bundle is configured to obtain data based on measurements from the one or more sensors utilizing one or more user defined functions implemented by the application.

5. The method of claim 4, wherein:
a) the method comprises, for at least one of the sets of workflow instructions, using a development environment to define the workflow corresponding to that set of workflow instructions, wherein defining the workflow corresponding to that set of workflow instructions comprises incorporating at least one of the one or more user-defined functions into the workflow corresponding to that set of workflow instructions; and
b) the development environment is configured to automatically generate the bundle using a set of import functions, wherein the set of import functions comprises the first import function and the second import function.

6. The method of claim 5, wherein:
a) the development environment is a visual development environment; and
b) the device does not have an operating system.

7. The method of claim 5, wherein the development environment is configured to generate the bundle by performing acts comprising:
a) creating one or more sets of intermediate workflow instructions in a first language;
b) creating a set of intermediate agent instructions in the first language;
c) generating the one or more sets of workflow instructions by transforming the one or more sets of intermediate workflow instructions into a second language; and
d) generating the set of agent instructions by transforming the set of intermediate agent instructions into the second language.

8. The method of claim 3, wherein the method comprises:
a) providing an updated bundle to the device, wherein the updated bundle comprises an updated set of agent instructions;
b) in response to the updated bundle being provided to the device:
  i) the set of agent instructions using the first import function to write one or more data values to memory locations outside of the runtime environment;
  ii) the application performing a set of update actions comprising:
    A) deallocating the runtime environment;
    B) setting up a new runtime environment in the memory; and
    C) executing the updated bundle in the new runtime environment; and
  iii) the updated set of agent instructions reading the one or more data values using the second import function.

9. The method of claim 8, wherein the application continuously executes while performing the set of update actions.

10. The method of claim 2, wherein executing the bundle in the runtime environment comprises initiating execution of the set of agent instructions by calling a function implemented by the set of agent instructions.

11. A system comprising a device comprising:
a) a memory, wherein the memory is a dynamic memory and stores a bundle comprising:
  i) one or more sets of workflow instructions, wherein each set of workflow instructions is operable to, when executed, perform a workflow corresponding to that set of workflow instructions; and
  ii) a set of agent instructions comprising executable code operable to, when executed, establish an agent comprising implementations of one or more trigger functions and a proceeding function on a device, the agent configured to perform a set of agent acts comprising:
    A) receiving inputs from an application resident on the device; and
    B) based on the inputs from the application, controlling execution of the one or more sets of workflow instructions, wherein controlling execution of the one or more sets of workflow instructions comprises:
      i) upon receiving a call to the one or more trigger functions:
        A) identifying a set of workflow instructions corresponding to the received call to the one or more trigger functions;
        B) adding the workflow corresponding to the identified set of workflow instructions to a queue; and
      ii) upon receiving a call to the proceeding function:
        A) removing a workflow from the queue; and
        B) executing the set of workflow instructions corresponding to the removed workflow;
b) a firmware, the firmware storing the application, wherein the application is operable to, when executed, perform a set of application acts comprising:
  i) setting up a runtime environment in the memory; and
  ii) executing the bundle in the runtime environment; and
c) a processor configured to execute the application, wherein the application, when executed performs the steps of,
  i) repeatedly calling the proceeding function after initiating execution of the set of agent instructions; and
  ii) making at least one call to the one or more trigger functions.

12. The system of claim 11, wherein:
a) setting up the runtime environment in the memory comprises identifying a set of memory locations comprised by the memory as accessible from the runtime environment;
b) the bundle is configured to:
  i) write data to memory locations other than the set of memory locations identified as accessible from the runtime environment using a first import function implemented by the application wherein memory locations other than the set of memory locations identified as accessible from the runtime environment are outside of the runtime environment; and
  ii) read data from memory locations other than the set of memory locations identified as accessible from the runtime environment using a second import function implemented by the application wherein memory locations other than the set of memory locations identified as accessible from the runtime environment are outside of the runtime environment.

13. The system of claim 12, wherein:
a) the device comprises one or more sensors; and
b) the bundle is configured to obtain data based on measurements from the one or more sensors utilizing one or more user-defined functions implemented by the application.

14. The system of claim 13, wherein the system comprises a server connected to the device via a network connection, wherein the server stores instructions for a development environment, the instructions comprising names of a set of import functions comprising the first import function and the second import function, wherein the development environment is configured to:
a) present an interface operable by a user to:
  i) define a workflow under development as a sequence of nodes;
  ii) include a desired user-defined function from the one or more user-defined functions by performing acts comprising:
    A) adding a first node having a first node type to the sequence of nodes;
    B) specifying a name of the desired user-defined function as data for the first node; and
  iii) include desired functionality for interacting with one or more targets outside of the runtime environment by adding a second node having a second type to the sequence of nodes, wherein the second type corresponds to the desired functionality;
b) automatically generate code for execution in the runtime environment based on the workflow under development by performing acts comprising:
  i) incorporating a call to the desired function into the automatically generated code based on the name of the desired function being specified by the user; and
  ii) incorporating a call to at least one of the set of import functions based on the second node having the second type being added to the sequence of nodes.

15. The system of claim 14, wherein the device does not have an operating system.

16. The system of claim 14, wherein the development environment is configured to generate code for execution in the runtime environment by performing acts comprising:
a) creating a set of intermediate instructions in a first language based on:
  i) the workflow under development; and
  ii) a set of agent instructions incorporated into the development environment; and
b) generating the code for execution in the runtime environment in a second language based on the set of intermediate instructions.

17. The system of claim 11, wherein executing the bundle in the runtime environment comprises initiating execution of the set of agent instructions by calling a function implemented by the set of agent instructions.

18. A machine comprising:
a) a sensor; and
b) on a device lacking an operating system, means for controlling the device lacking the operating system using an application stored in firmware on the device, wherein the dynamic memory stores a bundle comprising:
  i) one or more sets of workflow instructions, wherein each set of workflow instructions is operable to, when executed, perform a workflow corresponding to that set of workflow instructions; and
  ii) a set of agent instructions comprising executable code operable to, when executed, establish an agent comprising implementations of one or more trigger functions and a proceeding function on a device, the agent configured to perform a set of agent acts comprising:
    A) receiving inputs from an application resident on the device; and
    B) based on the inputs from the application, controlling execution of the one or more sets of workflow instructions, wherein controlling execution of the one or more sets of workflow instructions comprises:
      i) upon receiving a call to the one or more trigger functions:
        A) identifying a set of workflow instructions corresponding to the received call to the one or more trigger functions;
        B) adding the workflow corresponding to the identified set of workflow instructions to a queue; and
      ii) upon receiving a call to the proceeding function:
        A) removing a workflow from the queue; and
        B) executing the set of workflow instructions corresponding to the removed workflow; and
c) on the device, means for executing, by the application, the bundle on the device, wherein the application, when executed performs the steps of,
  i) repeatedly calling the proceeding function after initiating execution of the set of agent instructions; and
  ii) making at least one call to the one or more trigger functions.

* * * * *